(12) United States Patent
Kritt et al.

(10) Patent No.: US 8,266,230 B2
(45) Date of Patent: *Sep. 11, 2012

(54) ACTIVE REMOVAL OF E-MAIL RECIPIENT FROM REPLIES AND SUBSEQUENT THREADS

(75) Inventors: Barry A. Kritt, Raleigh, NC (US);
Thomas S. Mazzeo, Durham, NC (US);
Rodney E. Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/094,052

(22) Filed: Apr. 26, 2011

(65) Prior Publication Data

US 2011/0202618 A1    Aug. 18, 2011

Related U.S. Application Data

(62) Division of application No. 11/942,499, filed on Nov. 19, 2007, now Pat. No. 7,945,629.

(51) Int. Cl.
*G06F 15/16* (2006.01)
*G06F 7/00* (2006.01)
(52) U.S. Cl. ............... 709/206; 709/203; 707/609
(58) Field of Classification Search .............. 709/203, 709/206; 707/609
See application file for complete search history.

(56) References Cited

U.S. PATENT DOCUMENTS

| 5,826,022 | A | 10/1998 | Nielsen |
| 5,864,684 | A | 1/1999 | Nielsen |
| 6,167,434 | A | 12/2000 | Pang |
| 6,330,590 | B1 | 12/2001 | Cotten |
| 6,493,007 | B1* | 12/2002 | Pang .............................. 715/835 |
| 6,970,907 | B1 | 11/2005 | Ullmann et al. |
| 7,483,947 | B2 | 1/2009 | Starbuck et al. |
| 2003/0158903 | A1* | 8/2003 | Rohall et al. ................... 709/206 |
| 2004/0221062 | A1 | 11/2004 | Starbuck et al. |
| 2006/0075040 | A1* | 4/2006 | Chmaytelli .................... 709/206 |
| 2006/0168024 | A1* | 7/2006 | Mehr et al. ..................... 709/206 |
| 2006/0190830 | A1* | 8/2006 | Gerstl et al. ................... 715/757 |
| 2009/0132663 | A1 | 5/2009 | Kritt et al. |

OTHER PUBLICATIONS

Venolia et al., "Supporting Email Workflow", 2001, pp. 1-8, retrieved Oct. 22, 2007 http://research.microsoft.com/research/coet/Email/TRs/01-88.pdf.
Spertus et al., "Dynamic Sublists: Scaling Unmoderated Mailing Lists", USENIX Association, Proceedings of the LISA 20010 15th Systems Administration Conference, San Diego, California, Dec. 2001, pp. 211-218.
USPTO Office Action for U.S. Appl. No. 11/942,499 dated Jan. 28, 2010.

(Continued)

*Primary Examiner* — Ranodhi Serrao
(74) *Attorney, Agent, or Firm* — Yee & Associates, P.C.; Steven L. Bennett (57) ABSTRACT

A computer program product prevents the delivery of undesired e-mail message. A remove request is received from a non-desiring client. The remove request identifies a first subject line or a first body text from a previous e-mail message. An active request is updated with the remove request. Responsive to updating the active requests, the non-desiring client is redacted from a previously received message within a message file. The previously received message includes a second subject line that matches the first subject line, or a second body text that matches the first body text.

13 Claims, 5 Drawing Sheets

OTHER PUBLICATIONS

USPTO Final Office Action for U.S. Appl. No. 11/942,499 dated Jun. 11, 2010.

USPTO Notice of Allowance for U.S. Appl. No. 11/942,499 dated Jan. 10, 2011.

* cited by examiner

ACTIVE REMOVAL OF E-MAIL RECIPIENT FROM REPLIES AND SUBSEQUENT THREADS

This application is a divisional of application Ser. No. 11/942,499, filed Nov. 19, 2007, now U.S. Pat. No. 7,945,629, issued May 17, 2011.

BACKGROUND

1. Field

The present invention relates generally to a computer program product. More specifically, the present invention relates to a computer program product for preventing the delivery of undesired e-mail messages.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information travels between computers over the Internet through a variety of languages also referred to as protocols. The set of protocols used on the Internet is called the Transmission Control Protocol/Internet Protocol (TCP/IP).

The Internet has revolutionized communications and commerce, as well as being a source of information and entertainment. For many users, e-mail is a widely used format to communicate over the Internet. It is commonplace for users to send e-mail messages to others users through the Internet.

The use of e-mail messages is commonplace for personal and business use. E-mail messages are used by individuals to keep in touch with and communicate with other users. Additionally, e-mail messages provide a medium to collaborate and exchange documents.

The amount of e-mail messages sent in the business environment has grown exponentially. Managing and responding to e-mail messages can be an enormous burden to employees and can adversely impact their productivity. Particularly problematic, is the tendency of e-mail senders to include more recipients than necessary when composing new e-mail messages. This problem is compounded when recipients of the unwanted e-mail messages "reply to all" when sending a response to stop receiving unwanted email messages. Thus, a recipient may be inundated with numerous replies to an e-mail message that was originally unwanted.

Currently, the only recourse the recipient of the unwanted e-mail message has to stop the flood of responses is to issue a "reply to all" e-mail message directed to other "to:" or "cc:" recipients, asking them to delete the original recipient from any additional responses to the thread. This request method is often ineffective, since it relies on each "to:" or "cc:" recipient to delete the original non-desiring recipient from their responses. Furthermore, this request method only adds to the glut of unwanted e-mail messages being sent to other users.

Therefore, it would be advantageous to have a computer program product to address the above described problems as well as other problems.

SUMMARY

The illustrative embodiments describe a computer program product for preventing the delivery of undesired e-mail message. A user of an e-mail system may decide that e-mail messages of a specific subject are not desired. The e-mail user initiates a remove request so that e-mail user can identify that he or she does not desire e-mail messages of a particular subject in the future. A remove request is received from a non-desiring client. The remove request identifies a first subject line or a first body text from a previous e-mail message. An active request is updated with the remove request. Responsive to updating the active requests, the non-desiring client's email address is redacted from a previously received message within a message file. The previously received message includes a second subject line that matches the first subject line, or a second body text that matches the first body text.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
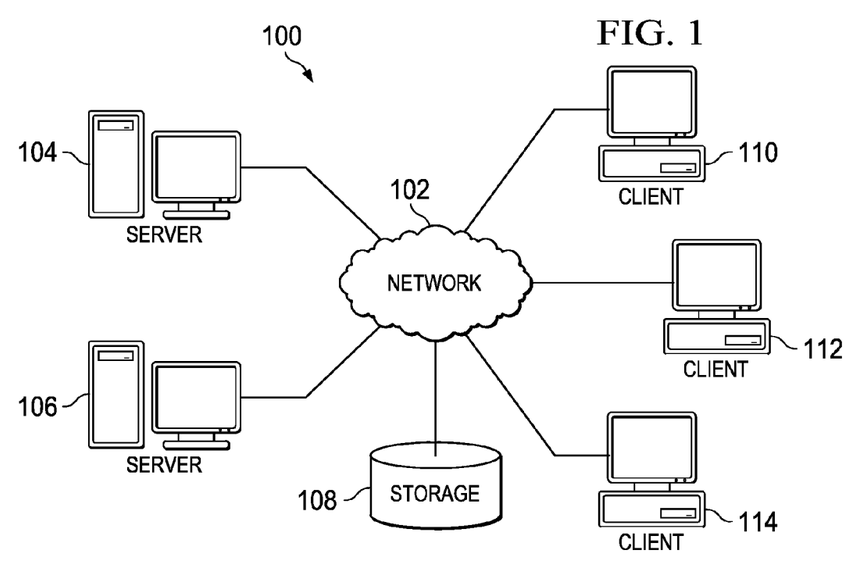
FIG. 1 is a pictorial representation of a network of data processing systems in which illustrative embodiments may be implemented.
Figure 2:
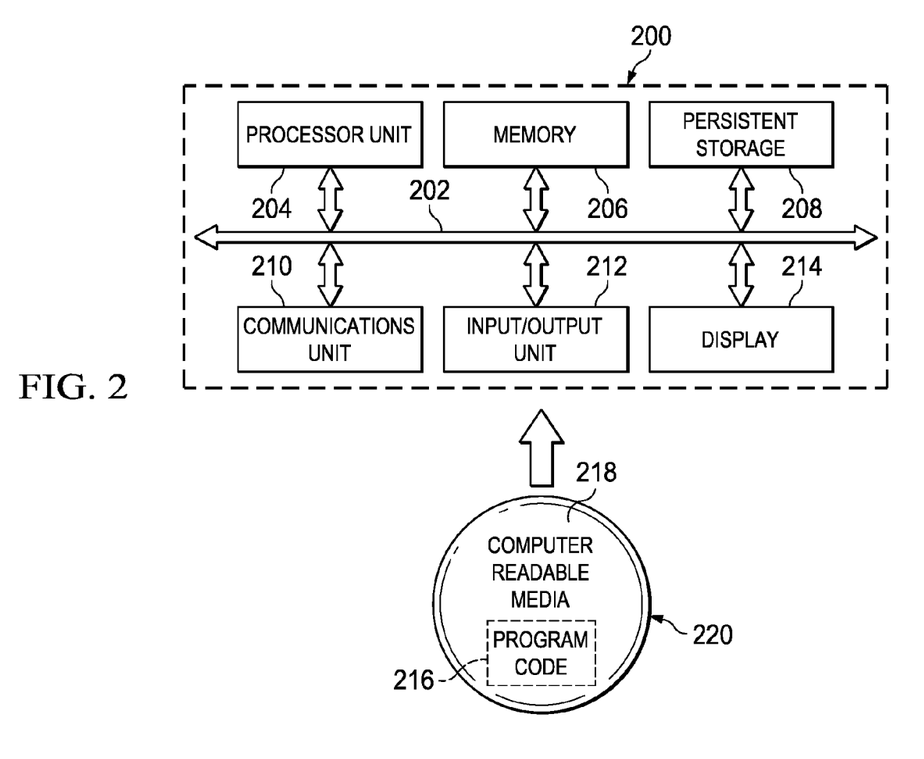
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Server 104 can contain e-mail profiles and message files for clients 110, 112, and 114. Clients 110, 112, and 114 are clients to server 104 in this example. Network data processing system 100 may include additional servers, clients, and other devices not shown. Clients 110, 112, and 114 are able to receive e-mail messages by accessing their e-mail profile and message file stored on the e-mail server, such as server 104.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
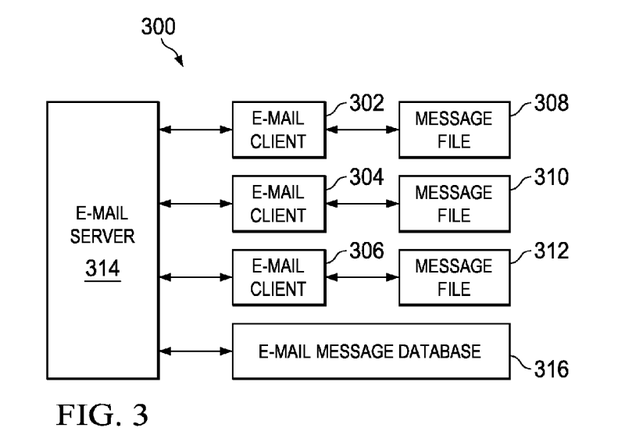
FIG. 3 is a diagram illustrating an e-mail messaging system depicted in which illustrative embodiments may be implemented.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an inbox folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mail messages back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

The illustrative embodiments herein describe a computer program product for preventing the delivery of undesired e-mail messages. A user of an e-mail system may decide that e-mail messages of a specific subject are not desired. The e-mail user initiates a remove request so that e-mail user can identify, to all e-mail addresses in the "from:", "to:", "cc:", and "bcc:" lists in the initiating e-mail message, that he or she does not desire e-mail messages of a particular subject in the future. A remove request is received from a non-desiring client—that is, a client in receipt of the e-mail message who does not desire to be included on subsequent related e-mail messages. The remove request identifies a first e-mail content. The e-mail content includes at least a first subject line or a first body text from a previous e-mail message. An active request is updated with the remove request. Active request is a list, folder, or other data structure containing active remove requests. When a remove request is received, the remove request of return e-mail message to active requests. The remove request identifies the non-desiring client and at least one of the first subject line or the first body text from the previous e-mail message.

Responsive to updating the active requests, the non-desiring client's e-mail address is redacted from a previously received e-mail message within a message file. The previously received message includes a second e-mail content. The second e-mail content includes at least a second subject line that matches the first subject line, or a second body text that matches the first body text.

Figure 4:
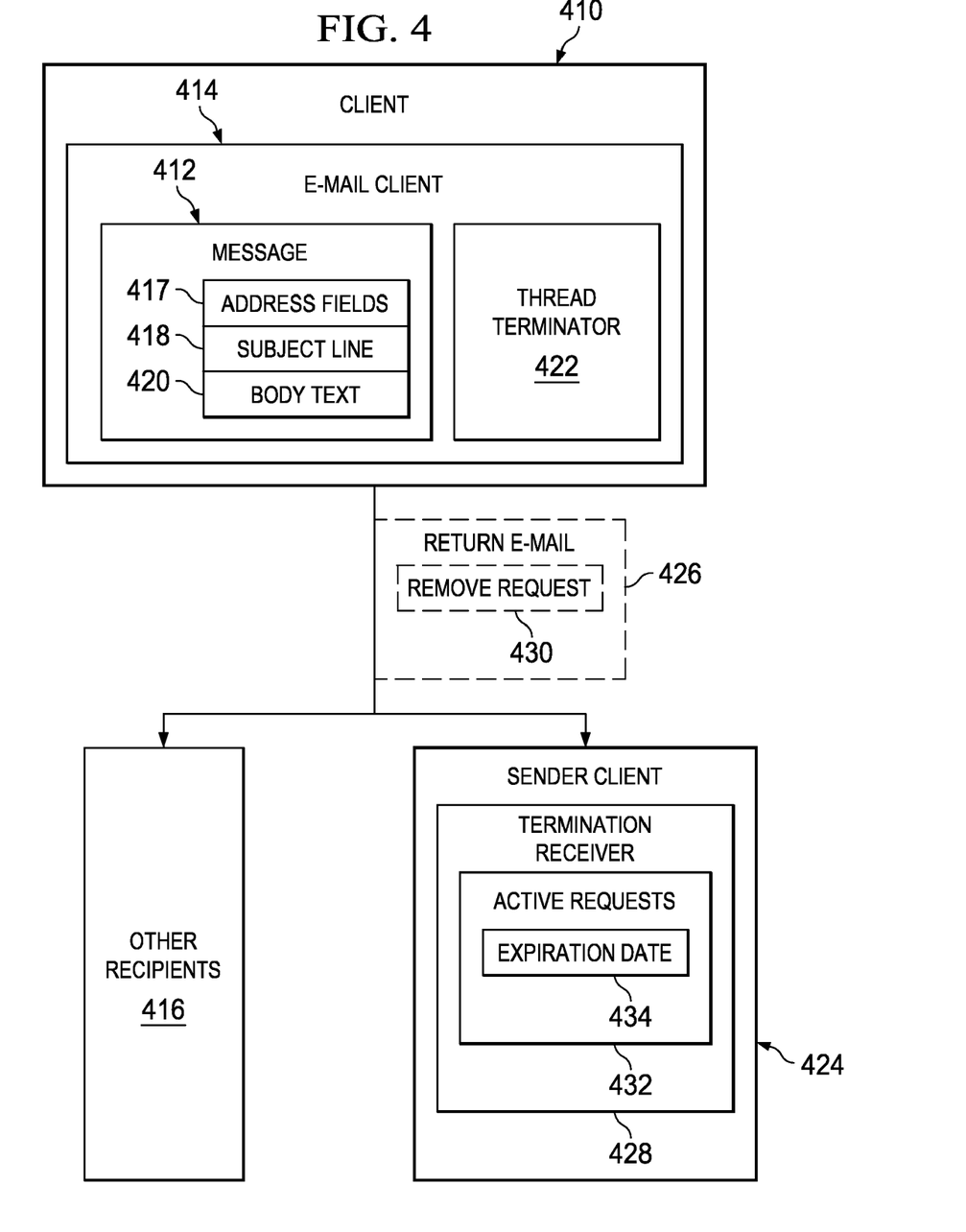
FIG. 4 is a diagram illustrating a data flow between components of an e-mail messaging system in which illustrative embodiments may be implemented.

Turning now to FIG. 4, a diagram illustrating a data flow between components of an e-mail messaging system is depicted in accordance with an illustrative embodiment. E-mail messaging system 400 can be e-mail messaging system 300 of FIG. 3.

A user of client 410 utilizes e-mail client 414 to access message 412. E-mail client 414 can be email client 302, 304, and 306 of FIG. 3. Message 412 contains other recipients 416 listed in the address fields of message 412, as well as the e-mail address of a sender client 424. Other recipients 416 can be listed in the "to:" field, the "cc:" field, or the "bcc:" field. Sender client 424 is typically listed in the "from:" field. Message 412 also contains subject line 418, and body text 420.

Responsive to the user of client 410 determining that message 412 is an undesired message, the user of client 410 initiates a return e-mail message 426 when e-mail client 414 calls thread terminator 422. Thread terminator 422 is a software component that allows client 410 to systematically request the removal of client 410 from the originally sent message 412 at the sender client 424, as well as other recipients 416 of message 412. Thread terminator 422 requests the removal of client 410 based on the e-mail content. The e-mail content can include at least one of a subject line 418 or body text 420. Body text 420 is the text of the e-mail which is not an e-mail address or e-mail subject line.

Thread terminator 422 can be included in the functionality of e-mail client 410. Thread terminator 422 can be implemented as a plug-in that embeds into e-mail client 410. Thread terminator 422 can also be implemented as a stand alone application that works in conjunction with e-mail client 410.

Thread terminator 422 creates return e-mail message 426 addressed to sender client 424 and other recipients 416. Responsive to initiating the return e-mail message 426, a dialogue box can be opened that allows client 410 to select or input possible variations to subject line 418. The dialogue box can also record other specific text strings which client 410 finds will also identify similarly unwanted e-mail messages.

By way of example, if a recipient receives an e-mail message with the subject line "Fourth Quarter Pencil Usage Report" and does not want to receive any more e-mail messages on this subject, or threads spawned from this subject, the dialogue box in return e-mail message 426 may have the following "check box" type selections:

1. Remove me from all e-mail messages with the exact subject line text.
2. Remove me from all e-mail messages with "FW:" or "Re:" and the subject line text.
3. Remove me from e-mail messages with the following text strings.

The first choice, namely "Remove me from all e-mail messages with the exact subject line text" would remove the recipient from any new notes on the same subject. This selection would be effective in preventing the receipt of any new threads or repetitious sending of the original note. The second choice, namely "Remove me from all e-mail messages with 'FW:' or 'Re:' and the subject line text" would remove the recipient from any forwards or replies to the original message. This selection would be effective in preventing the receipt of replies to the original message from other recipients, such as other recipients 416 of the original message. The final selection, namely "Remove me from e-mail messages with the following text strings:" would allow client 410 to enter specific user defined variants of subject line 418. Continuing with the present example, if client 410 received the e-mail message with the subject line "Fourth Quarter Pencil Usage Report", client 410 may enter user defined variants, such as "Pencil Usage", "Pencil Report", or "Paper Usage."

Thread terminator 422 then sends return e-mail message 426 to sender client 424 and other recipients 416. Return e-mail message 426 contains remove request 430 to remove client 410 from any subsequently created e-mail messages having a subject line 418 or body text 420 similar to that contained in message 412, as indicated by client 410 in the dialogue window.

Preferably, return e-mail message 426 contains a viewable request that can be read by a user. The viewable request allows a user of a client that does not have a corresponding termination receiver 428 to still view and read return e-mail message 426. A user of a client not having termination receiver 428 installed can still manually review and process requests to remove client 410 from any subsequent e-mail messages.

However, a user of a client having termination receiver 426 installed will have subsequent e-mail messages automatically processed as described.

Return e-mail message 426 is received by sender client 424. Return e-mail message 426 is also received by clients corresponding to other recipients 416 to which message 412 was also addressed. These other clients will perform processing steps similar to those performed by sender client 424. However, for ease of explanation, only those steps performed by sender client 424 are currently described.

Responsive to receiving return e-mail message 426, termination receiver 428 adds remove request 430 of return e-mail message 426 to active requests 432. Return e-mail message 426 can be automatically processed by termination receiver 428, and removed from the inbox of sender client 424, so that the user of sender client 424 does not have to manually deal with return e-mail message 426. Termination receiver 428 is a software component executing on sender client 424. Termination receiver 428 can be included in the functionality of sender client 424. Termination receiver 428 can be implemented as a plug-in that embeds into sender client 424. Termination receiver 428 can also be implemented as a stand alone application that works in conjunction with sender client 424. In an illustrative embodiment, termination receiver 428 and thread terminator 422 can be software components of a single software package or software application.

Active requests 432 is a list, folder, or other data structure containing active remove requests, such as remove request 430. Active requests 432 is accessible by sender client 424, such that a user can manually check and monitor any remove requests contained therein.

For as long as remove request 430 remains in active requests 432, termination receiver 428 automatically parses, or otherwise searches, all active e-mail messages in the message file of sender, including the mailboxes therein. Termination receiver 428 parses the message file to find any messages containing parameters matching the subject line 418 and body text 420 of message 412 that was undesired by client 410.

If termination receiver 428 identifies any message within the message file sender client 424 that contains parameters matching the subject line 418 or body text 420, termination receiver 428 modifies the "to:", "cc:", and "bcc:" address fields in the message file to prevent client 410's e-mail address from being included on any forwards or replies to message 412, or any previously received related messages. In the illustrative embodiments, termination receiver 428 does not simply delete client 410's e-mail address, but rather alters the message file in such a way that client 410's e-mail address remains associated with message 412. However, any responses or forwards of message 412 will not result in the delivery of the forwarded message or response to client 410.

In one illustrative embodiment, termination receiver 428 modifies the "to:", "cc:", and "bcc:" address fields in the message file by replacing client 410's e-mail address with a non-deliverable descriptive comment. If termination receiver 428 identifies client 410's e-mail address in an e-mail message having an identified subject line or body text identical to subject line 418 or body text 420, termination receiver 428 replaces client 410's e-mail address with a non-deliverable descriptive comment. This non-deliverable descriptive comment informs sender client 424 that client 410 has opted not to receive any replies or forwards of message 412. As one illustrative example, the non-deliverable descriptive comment could state, "e-mail address removed by thread terminator—john.doe@acbco.com". Should sender client 424 attempt to "reply to all," it would be clear by the non-deliverable descriptive comment that client 410 has opted out of receiving any responses to message 412.

In another illustrative embodiment, termination receiver 428 modifies the "to:", "cc:", and "bcc:" address fields in the message file by removing client 410's e-mail address from those fields and then moving client 410's e-mail address to a non-deliverable address field. If termination receiver 428 identifies client 410's e-mail address in an e-mail message having an identified subject line or body text identical to an e-mail message's subject line 418 or body text 420, termination receiver 428 moves client 410's e-mail address to the non-deliverable address field. The e-mail addresses appearing in the non-deliverable address field allows sender client 424 to identify that client 410 has opted not to receive any replies or forwards of message 412.

An expiration date 434 is associated with remove request 430 in active requests 432. Each remove request that is placed into active requests 432 is given a separate expiration date 434 so that each remove request can be separately tracked. Expiration data 434 is a calendar date, a time of day, or a time duration, the occurrence of which will cause remove request 430 to become inactive. Remove request 430 can become inactive by deleting remove request 430 from active requests 432. Remove request 430 can also become inactive by flagging or otherwise identifying that remove request 430 within active requests 432 is no longer an active request.

The calendar date, time of day, or time duration of expiration date 434 can be adjusted by each user. By adjusting expiration date 434, each user can control when remove request 430 would no longer be an active request. A default value may initially be set for remove request 430 when it is initially added to active requests 432. A default value ensures that remove request 432 remains active within active requests 432 just long enough to stop the majority of threads in all e-mail message threads originated from message 412. If remove request 432 is kept in active requests 432 for too short a period of time, threads from other persons that may be offline for a period of time could result in future threads not getting processed. Likewise, if remove request 430 is kept active too long, it could create unnecessary processing activity, and could generate unwanted future thread removals.

As long as remove request 430 remains in active requests 432, termination receiver 428 automatically searches all active e-mail messages in sender client 424's message file, including any mailboxes therein. Termination receiver 428 searches for, and processes any parameters matching the subject line 418 and body text 420 of message 412 that was undesired by client 410.

Figure 5:
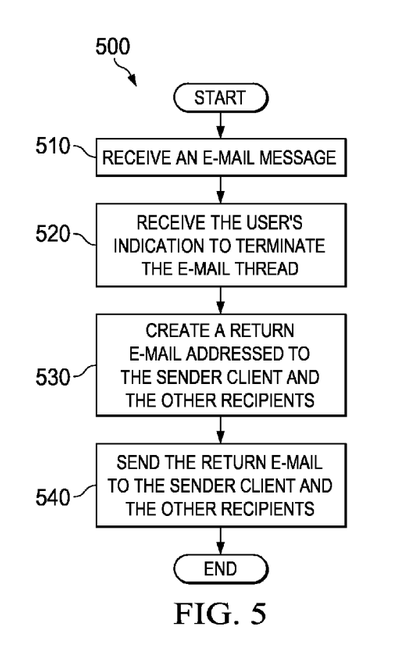
FIG. 5 is a flowchart for a process of sending a "thread terminator" message in which illustrative embodiments may be implemented.

Referring now to FIG. 5, a process for sending a thread terminator is depicted in accordance with an illustrative embodiment. Process 500 is a software process executing on a software component, such as thread terminator 422 of FIG. 4.

Process 500 begins by receiving an e-mail message (step 510), such as message 412 of FIG. 4. The e-mail message contains other recipients listed in the address fields of the e-mail message, as well as the e-mail address of a sender client. The other recipients can be listed in the "to:" field, the "cc:" field, or the "bcc:" field. The sender client is typically listed in the "from:" field. The e-mail message also contains a subject line and body text.

When the e-mail message is viewed by a client, the client makes a determination as to whether subsequent forwards and responses to the e-mail message should be received. If the client decides that the message is not desired, and that subsequent forwards and responses should not be received, then the client inputs this indication. Process 500 therefore receives the user's indication to terminate the e-mail thread (step 520). The indication can be, for example, a click of an icon by the user, indicating that the message is not desired.

Responsive to receiving the indication, process 500 creates return an e-mail message addressed to the sender client and the other recipients (step 530). The return e-mail message includes a dialogue box that allows the client to select or input possible variations to the subject line. The dialogue box can also record other specific text strings which the client finds will also identify similar unwanted e-mail messages.

By way of example, if the client receives an e-mail message with the subject line "Fourth Quarter Pencil Usage Report" and does not want to receive any more e-mail messages on this subject, or threads spawned from this subject, the dialogue box in the return e-mail message may have the following "check box" type selections:
1. Remove me from all e-mail messages with the exact subject line text.
2. Remove me from all e-mail messages with "FW:" or "Re:" and the subject line text.
3. Remove me from e-mail messages with the following text strings.

The first choice, namely "Remove me from all e-mail messages with the exact subject line text" would remove the recipient from any new notes on the same subject. This selection would be effective in preventing the receipt of any new threads or repetitious sending of the original note. The second choice, namely "Remove me from all e-mail messages with 'FW:' or 'Re:' and the subject line text" would remove the recipient from any forwards or replies to the original message.

This selection would be effective in preventing the receipt of replies to the original message from other recipients, such as other recipients 416 of FIG. 4. The final selection, namely "Remove me from e-mail messages with the following text strings:" would allow a client, such as client 410 of FIG. 4, to enter specific user defined variants of the subject line, such as subject line 418 of FIG. 4. Continuing with the present example, if the client received the e-mail message with the subject line "Fourth Quarter Pencil Usage Report", the client may enter user defined variants, such as "Pencil Usage", "Pencil Report", or "Paper Usage."

Process 500 then sends the return e-mail message, such as return e-mail message 426 of FIG. 4, to the sender client and the other recipients (step 540), with the process terminating thereafter. Return e-mail message contains a remove request to remove the client from any subsequently created e-mail messages having a subject line or body text similar to that contained in message, as indicated by the client.

Figure 6:
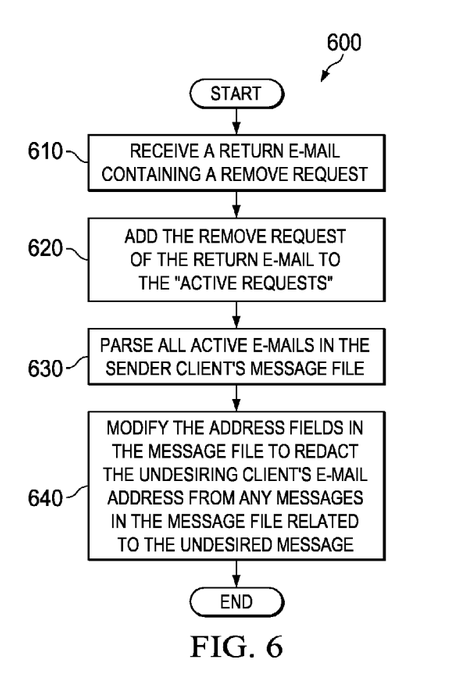
FIG. 6 is a flowchart for a process of receiving a remove request and updating an active requests in which illustrative embodiments may be implemented.

Referring now to FIG. 6, a process for receiving a remove request and updating an active requests file is depicted in accordance with an illustrative embodiment. Process 600 is a software process executing on a software component, such as termination receiver 428 of FIG. 4.

Process 600 begins by receiving a return e-mail message containing a remove request (step 610). The return e-mail message can be return e-mail message 426 of FIG. 4. The return e-mail message contains a remove request to remove the client from any subsequently created e-mail messages having a subject line or body text similar to that contained in the message, as indicated by the client. The return e-mail message is responsive to a previously sent e-mail message, such as message 412 of FIG. 4.

Responsive to receiving a return e-mail message, process 600 adds the remove request of the return e-mail message to the active requests (step 620). The return e-mail message can be automatically processed by process 600, and removed from the sender client's inbox, so that the sender client does not have to manually deal with the return e-mail message. The active request is a list, folder, or other data structure containing active remove requests. The active request is accessible such that a user can manually check and monitor any remove requests contained therein.

Process 600 automatically parses, or otherwise searches, all active e-mail messages in the sender client's message file (step 630), including the mailboxes therein. By parsing the message file, process 600 is able to find any messages containing parameters matching the subject line, such as subject line 418 of FIG. 4, or body text, such as body text 420 of FIG. 4.

If process 600 identifies any message within the sender client message file containing parameters matching the subject line or body text of the return e-mail message, process 600 modifies the address fields in the message file to redact the undesiring client's e-mail address from any messages in the message file related to the undesired message (step 640), with the process terminating thereafter. In the illustrative embodiments, process 600 does not simply delete the undesiring client's e-mail address from the "to:", "cc:", and "bcc:" address fields, but rather alters the message file in such a way that the undesiring client's e-mail address remains associated with message. However, any responses or forwards of the message will not result in the delivery of the forwarded message or response to the undesiring client.

In one illustrative embodiment, process 600 modifies the "to:", "cc:", and "bcc:" address fields in the message file by replacing the undesiring client's e-mail address with a non-deliverable descriptive comment. If process 600 identifies the undesiring client's e-mail address in an e-mail message having an identified subject line or body text identical to subject lines or body text of an active remove request, process 600 replaces the undesiring client's e-mail address with a non-deliverable descriptive comment. This non-deliverable descriptive comment informs the sender client that the undesiring client has opted not to receive any replies or forwards of the message. As one illustrative example, the non-deliverable descriptive comment could state, "e-mail address removed by thread terminator—john.doe@acbco.com". Should the sender client attempt to "reply to all," it would be clear by the non-deliverable descriptive comment that the undesiring client has opted out of receiving any responses to message.

In another illustrative embodiment, process 600 modifies the "to:", "cc:", and "bcc:" address fields in the message file by removing the undesiring client's e-mail address to a non-deliverable address field. If process 600 identifies the undesiring client's e-mail address in an e-mail message having an identified subject line or body text identical to subject lines or body text contained in an associated remove request, process 600 removes the undesiring client's e-mail address to the non-deliverable address field. E-mail addresses appearing in the non-deliverable address field allow a sender client to identify that the undesiring client has opted not to receive any replies or forwards of an associated message.

Any response to a message contained in the sender client's message file will not be sent to the undesiring client. The undesiring client's e-mail address is redacted from any preceding e-mail message containing the undesirable subject line or body text.

Figure 7:
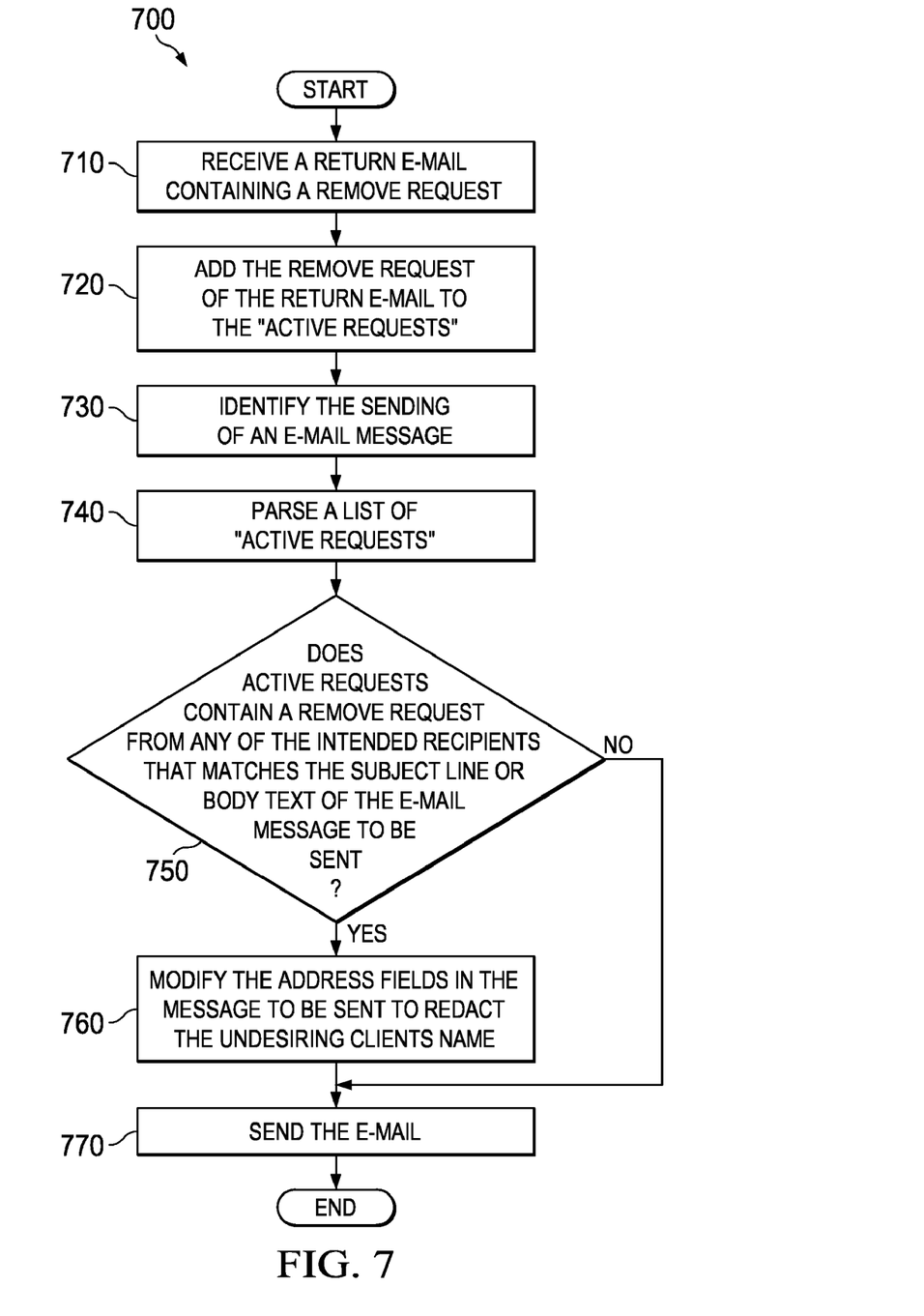
FIG. 7 is a flowchart for a process of receiving a remove request and updating an active requests in which illustrative embodiments may be implemented.

Referring now to FIG. 7, a process for receiving a remove request and updating an active requests file is depicted in accordance with an illustrative embodiment. Process 700 is a software process executing on a software component, such as termination receiver 428 of FIG. 4. Process 700 is an alternative embodiment of Process 600 of FIG. 6.

Process 700 begins by receiving a return e-mail containing a remove request (step 710). The return e-mail message can be return e-mail message 426 of FIG. 4. The return e-mail message contains a remove request to remove the client from any subsequently created e-mail messages having a subject line or body text similar to that contained in a message, as indicated by the client. The return e-mail message is responsive to a previously sent e-mail message, such as message 412 of FIG. 4.

Responsive to receiving a return e-mail message, process 700 adds the remove request of the return e-mail message to the active requests (step 720). The return e-mail message can be automatically processed by process 700, and removed from the sender client's inbox, so that the sender client does not have to manually deal with the return e-mail message. The active requests is a list, folder, or other data structure containing active remove requests. The Active requests is accessible such that a user can manually check and monitor any remove requests contained therein.

Process 700 identifies the sending of an e-mail message (step 730). The sending of an e-mail message can be the sending of any new e-mail message, reply to a previously received e-mail message, forwarding of a previously received e-mail message, or similar initiation. The e-mail message to be sent will include e-mail addresses of intended recipients, as well as a subject line and body text.

Responsive to identifying the sending of an e-mail message, process 700 parses a list of active requests (step 740). When parsing the active requests, process 700 identifies whether the active requests contain a remove request from any of the intended recipients that matches the subject line or body text of the e-mail message to be sent (step 750).

If process 700 determines that the active requests contain a remove request from any of the intended recipients matching the subject line or body text of the e-mail message to be sent ("yes" at step 750), process 700 modifies the address fields in the message to be sent to redact the undesiring client's e-mail address (step 760). In the illustrative embodiments, process 700 does not simply delete the undesiring client's e-mail address from the "to:", "cc:", and "bcc:" address fields, but rather alters the message file in such a way that the undesiring client's e-mail address remains associated with message. However, any responses or forwards of the message will not result in the delivery of the forwarded message or response to the undesiring client.

In one illustrative embodiment, process 700 modifies the "to:", "cc:", and "bcc:" address fields in the message file by replacing the undesiring client's e-mail address with a non-deliverable descriptive comment. If process 700 identifies the undesiring client's e-mail address in an e-mail message having an identified subject line or body text identical to subject lines or body text of an active remove request, process 700 replaces the undesiring client's e-mail address with a non-deliverable descriptive comment. This non-deliverable descriptive comment informs the sender client that the undesiring client has opted not to receive any replies or forwards of the message. As one illustrative example, the non-deliverable descriptive comment could state, "e-mail address removed by thread terminator—john.doe@acbco.com". Should the sender client attempt to "reply to all," it would be clear by the non-deliverable descriptive comment that the undesiring client has opted out of receiving any responses to message.

In another illustrative embodiment, process 700 modifies the "to:", "cc:", and "bcc:" address fields in the message file by removing the undesiring client's e-mail address to a non-deliverable address field. If process 700 identifies the undesiring client's e-mail address in an e-mail message having an identified subject line or body text identical to subject lines or body text of an active remove request, process 700 removes the undesiring client's e-mail address to the non-deliverable address field. E-mail addresses appearing in the non-deliverable address field allow a sender client to identify that the undesiring client has opted not to receive any replies or forwards of an associated message.

Responsive to modifying the address fields in the message to be sent to redact the undesiring client's e-mail address, process 700 sends the e-mail message (step 770), with the process terminating thereafter. The e-mail message will not be sent to the undesiring client. The undesiring client's e-mail address has been redacted from the e-mail message because the e-mail message has an identified subject line or body text identical to the subject lines or body text of an active remove request containing the undesirable subject line or body text submitted by the undesiring client.

Returning now to step 750, if process 700 does not identify that the active requests contain a remove request from any of the intended recipients matching the subject line or body text of the e-mail message to be sent ("no" at step 750), process 700 sends the e-mail message (step 770), with the process terminating thereafter. Because the e-mail message does not have an identified subject line or body text identical to the subject lines or body text of an active remove request, the e-mail message is sent to all of the intended recipients without any modification to redact the undesiring client's name.

Figure 8:
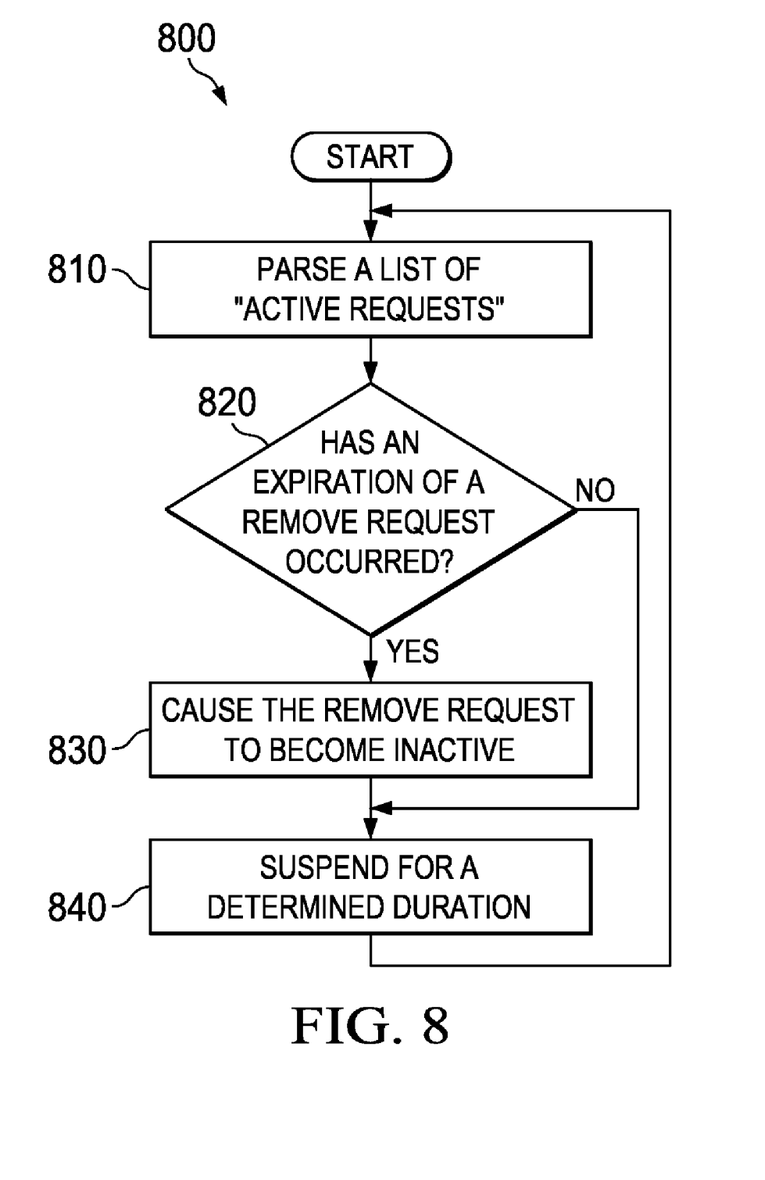
FIG. 8 is a flowchart for a process of removing an inactive remove request from the active requests in which illustrative embodiments may be implemented.

Referring now to FIG. 8, a process for removing an inactive remove request from the active requests is depicted in accordance with an illustrative embodiment. Process 800 is a software process executing on a software component, such as termination receiver 428 of FIG. 4.

Process 800 begins by parsing a list of active requests (step 810). When parsing the active requests, process 800 identifies the status of the expiration dates associated with each remove request in the active requests.

Each remove request that is placed into the active requests is initially given a separate expiration date so that each remove request can be separately tracked. The expiration date is a date or time duration, the occurrence of which will cause the remove request to become inactive.

Responsive to parsing a list of active requests, process 800 identifies whether an expiration of a remove request has occurred (step 820). The expiration date has occurred when the date of the expiration date has arrived or passed, or when the specified time duration has elapsed.

Responsive to determining that the remove request has occurred ("yes" at step 820), process 800 causes the remove request to become inactive (step 830). The remove request can become inactive by deleting or removing the remove request from the active requests. The remove request can also become inactive by flagging or otherwise identifying that the remove request within the active requests is no longer an active remove request.

Process 800 suspends for a determined duration (step 840), after which process 800 returns to step 810 to parse the list of active requests. The determined duration can be a set amount of time, for example 60 seconds. Similarly, the determined duration can be the occurrence of an event, such as the initiation of a new e-mail message, or the receipt of an e-mail message. Process 800 repeats intermittently for as long as the e-mail client is open on the associated client.

Returning now to step 820, responsive to determining that the remove request has not occurred ("no" at step 820), process 800 proceeds directly to step 840, suspending for a determined duration, after which process 800 returns to step 810 to parse the list of active requests. Process 800 repeats intermittently for as long as the e-mail client is open on the associated client.

The illustrative embodiments therefore describe a computer program product for preventing the delivery of undesired e-mail message. A user of an e-mail system may decide that e-mail messages of a specific subject are not desired. The e-mail user initiates a remove request so that e-mail user can identify, to all e-mail addresses in the "from:", "to:", "cc:", and "bcc:" lists in the initiating e-mail message, that he or she does not desire e-mail messages of a particular subject in the future. A remove request is received from a non-desiring client. The remove request identifies a first subject line or a first body text from a previous e-mail message. An active request is updated with the remove request. Responsive to updating the active requests, the non-desiring client is redacted from a previously received message within a message file. The previously received message includes a second subject line that matches the first subject line, or a second body text that matches the first body text.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer usable medium including computer usable program code for preventing delivery of undesired e-mail message, the computer program product comprising:
   computer usable code for receiving by a processor a remove request from a non-desiring client, wherein the remove request identifies a first e-mail content from a previous e-mail message, wherein the remove request is received in a return e-mail sent by the non-desiring client;
   computer usable code, responsive to receiving the remove request, for updating by the processor an active request with the remove request;
   computer usable code, responsive to updating the active request, for parsing by the processor a message file to identify a set of e-mail messages within the message file, wherein the set of e-mail messages corresponds to the remove request; and
   computer usable code, responsive to identifying the set of email messages, for redacting by the processor an e-mail address of the non-desiring client from a previously received message within the message file, wherein the previously received message comprises a second e-mail content that matches the first e-mail content.

2. The computer program product of claim 1 further comprising:
   computer usable code, responsive to updating the active request with the remove request, for parsing the message file to identify the previously received message, wherein the computer usable code for removing the non-desiring client from a previously received message within a message file is further responsive to identifying the previously received message within the message file.

3. The computer program product of claim 1 further comprising:
   computer usable code, responsive to updating the active requests with the remove request, associating by the processor an expiration date with the remove request.

4. The computer program product of claim 3, further comprising:
   computer usable code, responsive to the occurrence of the expiration date, redacting by the processor the remove request from the active requests.

5. The computer program product of claim 3, wherein the expiration date is a calendar date, a time of day, or a time duration.

6. The computer program product of claim 1, wherein the computer usable code for redacting the non-desiring client from the previously received message within the message file comprises computer usable code for removing the non-desiring client to a non-deliverable address field, or computer usable code for replacing the non-desiring client with a non-deliverable descriptive comment.

7. The computer program product of claim 1, wherein the second e-mail content matches the first e-mail content if at least a portion of a subject line of the second e-mail content matches at least a portion of a first subject line of the first e-mail content.

8. The computer program product of claim 1, wherein the second e-mail content matches the first e-mail content if a second body text of the second e-mail content includes at least a first body text of the first e-mail content.

9. The computer program product of claim 1, wherein the remove request contains a visible request.

10. The computer program product of claim 1, wherein the computer usable code for redacting the non-desiring client from the previously received message within the message file comprises:
   computer usable code for replacing the e-mail address of the non-desiring client with a non-deliverable descriptive comment.

11. The computer program product of claim 10, wherein the non-deliverable descriptive comment comprises a statement that the e-mail address of the non-desiring client was removed by a thread terminator.

12. The computer program product of claim 10, wherein the non-deliverable descriptive comment comprises a statement that the e-mail address of the non-desiring client was removed in response to receiving the remove request from the non-desiring client.

13. The computer program product of claim 10, wherein the non-deliverable descriptive comment comprises an undeliverable form of the e-mail address of the non-desiring client.

* * * * *